Aug. 18, 1931.  B. HARRIS  1,819,415
HYPODERMIC BULLET
Original Filed Sept. 19, 1927
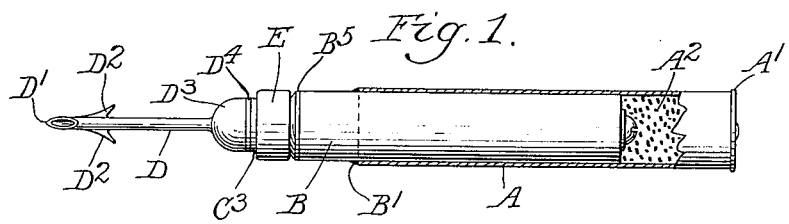
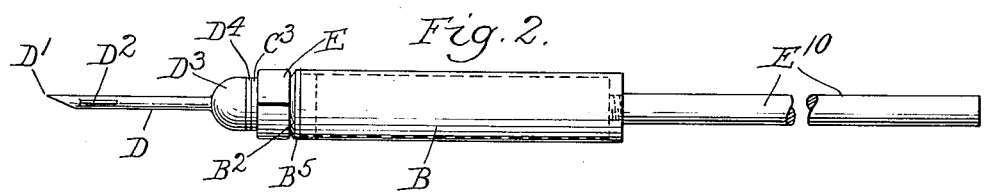
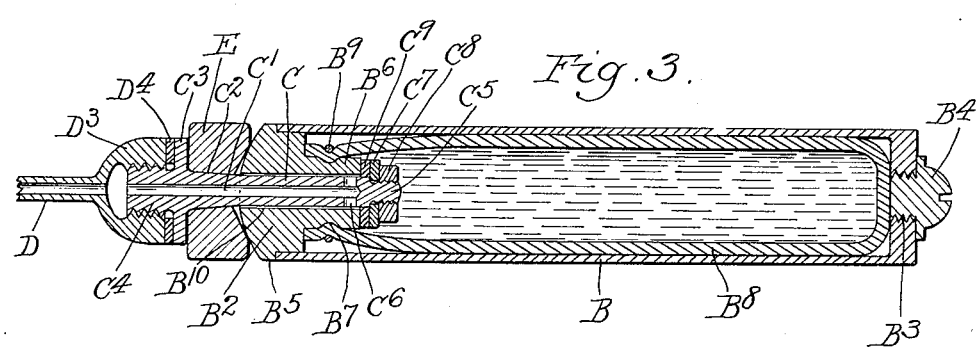
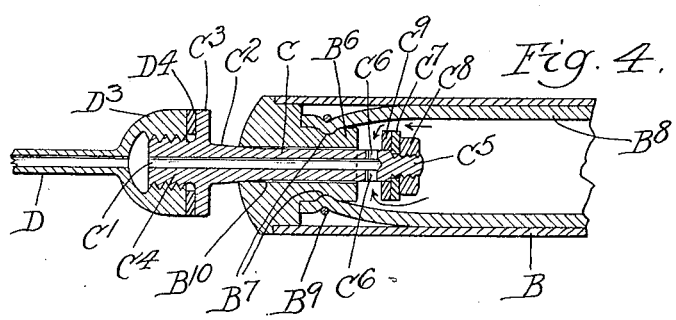
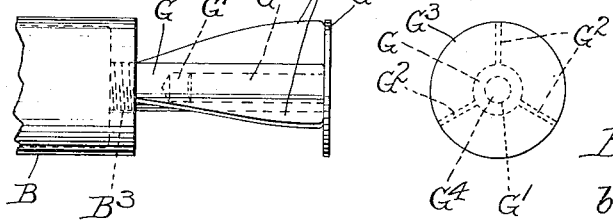
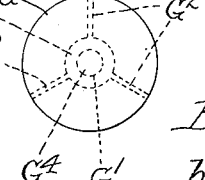
Inventor
Barnett Harris
by Parker & Carter
Attorneys.

Patented Aug. 18, 1931

1,819,415

UNITED STATES PATENT OFFICE

BARNETT HARRIS, OF NEW YORK, N. Y., ASSIGNOR OF ONE-HALF TO CHANNING R. DOOLEY, OF SUMMIT, NEW JERSEY

HYPODERMIC BULLET

Application filed September 19, 1927, Serial No. 220,483. Renewed November 7, 1930.

My invention relates to a bullet or shell in which the bullet portion proper includes or is replaced by means for injecting into the target a fluid or chemical effective to drug or paralyze the animal struck. One object is to provide a hypodermic or injector bullet for game shooting. Another object is the provision of means for preventing the separation of the hypodermic from the target or animal struck. Another object is the provision of means for insuring an immediate and relatively complete discharge of the chemical into the body of the animal upon contact of the bullet with the animal.

Other objects will appear from time to time in the course of the specification and claims.

I illustrate my invention more or less diagrammatically in the drawings, wherein—

Figure 1 is an elevation of the bullet with parts of the cartridge case broken away;

Figure 2 illustrates a variant form of the bullet, as modified, to be shot from the rifle;

Figure 3 is a longitudinal section through the bullet;

Figure 4 is a similar section illustrating the parts in a different position;

Figure 5 illustrates a variant detail; and

Figure 6 is an end view of the form shown in Figure 5, in position to be shot.

Like parts are indicated by like symbols throughout the specification and drawings.

Referring first to Figure 1 A indicates any suitable cartridge having a rim $A^1$ limiting its forward movement in the chamber of the shot gun or other arm with which it is used. Obviously any desired form of shell may be employed, its details forming no part of the present invention. $A^2$ indicates any suitable propulsive charge of powder or the like.

Seated in the shell is a cylinder B, which may be held normally in position either by its close fit with the interior of the cartridge A or by any suitable substance $B^1$, such as wax or the like. $B^2$ is a closure or plug inserted in one end of the cylinder B. The opposite end is apertured as at $B^3$ the aperture being closed for example by the screw $B^4$. The plug $B^2$ is limited as to inward movement by the ledge $B^5$ which conforms to the exterior of the cylinder B. The plug is further provided with a reduced interior portion $B^6$ which may have a circumferential channel $B^7$. $B^8$ is a flexible container into which may be inserted, in any desired maner, and preferably under high pressure, and preferably in fluid form, the drug to be employed. It may be held in position on the plug $B^6$ for example by the circumferential fastening member or band $B^9$, herein shown as overlying the channel $B^7$. The plug is longitudinally apertured as at $B^{10}$.

Mounted in the aperture $B^{10}$ is the hollow stem C with the longitudinal aperture $C^1$. It is forwardly enlarged or tapered as at $C^2$ and is provided at its forward end with the circumferential flange $C^3$ and the forward screw-threaded portion $C^4$. At the opposite end is the reduced screwthreaded portion $C^5$, and $C^6$ are laterally extending apertures in communication with the axial apertures $C^1$. $C^7$ is any suitable washer held in position by the nut $C^8$. $C^9$ is a washer or packing preferably of flexible material, adapted to seal the inner end of the aperture $B^{10}$ in response to the pressure against the washer $C^7$ and the nut $C^8$ directed by the fluid under pressure in the flexible and preferably yielding sac $B^8$.

D is any suitable needle having the point $D^1$, the barb or barbs $D^2$ and the screw-threaded enlargement $D^3$ whereby it may be secured to the screwthreaded portion $C^4$. $D^4$ is any suitable washer or packing adapted to produce a tight joint. Referring to the form of Figure 2 $E^{10}$ is a stem or shaft, which may conform to the bore of the rifle or pistol or revolver and which may be screwthreaded into the aperture $B^3$.

In order to prevent premature discharge of the fluid or chemical by the impact of the explosion of the propulsive charge, I provide a split washer E which may be interposed between the members $B^2$ and $C^3$, as shown in detail in Figure 3. If desired the cartridge may be extended forwardly about the washer but the disposition shown in the present drawings is satisfactory, the split washer being applied and inserted when the cartridge is thrust into place in the chamber of the weapon from which the bullet is to be fired. Any suitable means, such as wax or the like may be employed to hold the split washer together in case the cartridge is not extended forwardly far enough to cover it.

I may if necessary employ the tail shown in Figures 5 and 6 to prevent the bullet from tumbling, or spinning end over end. In the form herein shown I illustrate a hollow stem G screwthreaded into the aperture $B^3$. It is provided with an axial aperture $G^1$ and the fins $G^2$, herein shown as being slightly spiraled. $G^3$ is any suitable washer adapted to be interposed between the tail and the propulsive charge. It is provided with a pin or rod $G^4$ penetrating the aperture $G^1$.

It will be understood that when the bullet has passed from the barrel of the gun the split washer E, having nothing to maintain it in position, drops from the bullet. Also the washer $G^3$ drops off and nothing remains to interfere with the free flight and normal operation of the bullet.

It will be realized that whereas I have described and shown a practical and operative device nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

It is extremely desirable in game hunting and particularly in big game hunting to be able to take animals alive. This is particularly the case in hunting specimens for menageries, although of course my bullet is not limited to such use. I have therefore developed a bullet which may be shot from a gun as with an ordinary bullet or cartridge, or which may be used as a rifle grenade. The bullet, instead of being formed to penetrate and kill or wound the animal or target, is armed with a hypodermic needle which penetrates the skin of the animal. When the needle sinks so far into the animal that the member $D^3$ is contacted, the needle can penetrate no further and the forward movement of the whole projectile moves the cylinder B forwardly in relation to the stem $C^2$, as shown in Figure 4. Normally the stem C is in the position shown in Figure 3, with the apertures $C^6$ masked. It may be maintained in this position by any suitable means, whether by cementing or merely by the pressure of the liquid in the flexible container $B^8$. When the parts are moved to the position of Figure 4 the plug $B^2$ tends to jam on the tapered portion $C^2$ of the stem C, thus preventing any subsequent masking of the apertures $C^6$. The fluid within the sac $B^8$ then escapes through the apertures $C^6$ and along the aperture $C^1$ to and through the point of the needle. The sac $B^8$ is preferably sufficiently resilient or elastic to force the liquid out under sufficient pressure, but I do not wish to be limited to any particular means for exerting pressure on the liquid, since the same result may be obtained by other means. In any case the result of the use of my bullet is the hypodermic injection into the target of whatever drugs or chemicals may be contained within the sac $B^8$. The barbs $D^2$ prevent the animal from shaking off the hypodermic bullet if he feels its presence, and prevents its accidental displacement. Thus a complete discharge of the chemical is insured.

In order to bring down any desired animal it is necessary merely to determine the proper drug or proper dosage for any given size or species of animal. The weight and size of the bullet and the length and sharpness of the needle may be varied to suit conditions. Bullets of this type may be adapted for practically any size, bore or type of weapon.

I claim:

1. In a hypodermic bullet, a needle, a yielding walled reservoir adapted to contain a chemical charge, means for maintaining a charge contained normally within said reservoir and means for discharging said charge upon contact of the bullet with the target, including a perforated stem associated with said needle and adapted to be thrust inwardly into said reservoir in response to the impact of the bullet against the target.

2. In a hypodermic bullet, a needle, a yielding walled reservoir adapted to contain a chemical charge, means for maintaining said charge normally under pressure, a seal for said charge and means for breaking said seal and releasing said charge for passage through the needle, in response to the impact of the bullet.

3. In a hypodermic bullet, a needle, a reservoir adapted to contain a chemical charge, means for maintaining said charge normally under pressure, a seal for said charge and means for breaking said seal and releasing said charge for passage through the needle, upon contact of the bullet with the target, in response to the impact of the bullet.

4. In a hypodermic bullet, a needle, a reservoir adapted to contain a chemical charge, a stem associated with said needle having an aperture in communication with the aperture of said needle, an aperture at the inner end of said stem, normally masked, said stem being adapted to be thrust into said container, and for to expose said aperture to the contents of said container, in response to the impact of the bullet against the target.

5. In a hypodermic bullet, a needle, a reservoir adapted to contain a chemical charge, means for maintaining said charge normally under pressure and means for releasing said charge for passage through the needle, and means for preventing preliminary release of said charge in response to the impact of the propulsive explosion.

6. In a hypodermic bullet, a needle axially movable in relation to said bullet, a yielding walled reservoir adapted to contain a chemical charge, and means for releasing said charge for passage through said needle, in response to the contact of the bullet with the target.

7. In a hypodermic bullet, a needle axially movable in relation to said bullet, a yielding walled reservoir adapted to contain a chemical charge, and means for releasing said charge for passage through said needle, in response to the contact of the bullet with the target, including a seal adapted to be broken by the axial movement of the needle.

8. In a hypodermic bullet, a needle, a reservoir adapted to contain a chemical charge, a stop member on said needle adapted to engage the body of the target when the needle penetrates it to a predetermined depth, a stem associated with said needle and having an aperture in communication with the aperture of said needle, an aperture at the inner end of said stem, normally masked, said stem being adapted to be thrust into the container to unmask said aperture, in response to the impact of the bullet against the target and the engagement of the stop member with the target.

9. In a hypodermic bullet, a bullet body, a needle, a stem associated with said needle and mounted for axial movement in relation to said bullet body, a stop member on said stem, exterior of said bullet body, and means for positively preventing movement of said head portion and stem in the direction of said bullet body, in response to the impact of the propulsive charge.

10. In a hypodermic bullet, a bullet body, a needle, a stem associated with said needle and mounted for axial movement in relation to said bullet body, a stop member on said stem, exterior of said bullet body, and means for positively preventing movement of said head portion and stem in the direction of said bullet body, in response to the impact of the propulsive charge, including a split washer adapted to be positioned between the end of said bullet body and said stop member.

11. In a hypodermic bullet, a bullet body, a flexible container therein adapted to maintain pressure upon a charge of chemical enclosed in such container, a head member at one end of said bullet body having an axial aperture, a needle, a hollow, tapered stem associated therewith and penetrating said axial aperture, and a member at the inner end of said stem adapted normally to close said axial aperture.

12. In a hypodermic bullet, a bullet body, a flexible container therein adapted to maintain pressure upon a charge of chemical enclosed in such container, a head member at one end of said bullet body having an axial aperture, a needle, a hollow, tapered stem associated therewith and penetrating said axial aperture, and a member at the inner end of said stem adapted normally to close said axial aperture, including a washer normally responsive to the pressure in said flexible container.

13. In a hypodermic bullet, a bullet body, a flexible container therein adapted to maintain pressure upon a charge of chemical enclosed in such container, a head member at one end of said bullet body having an axial aperture, a needle, a hollow, tapered stem associated therewith and penetrating said axial aperture, and a member at the inner end of said stem adapted normally to close said axial aperture, including a washer normally responsive to the pressure in said flexible container, said stem having an aperture adapted to be put in communication with the interior of said flexible container in response to axial movement of said stem into said container.

14. In a hypodermic bullet, a bullet body, a needle projecting forwardly from the forward end of said body, a yielding walled container positioned within the bullet body and adapted to maintain a hypodermic charge under pressure, a sealing means for said charge, the needle being apertured for communication with said charge upon the breaking of said seal and means for unsealing said charge in response to the impact of the bullet.

15. In a hypodermic bullet, a bullet body, a needle projecting forwardly from the forward end of said body, a yielding walled container positioned within the bullet body and adapted to maintain a hypodermic charge under pressure, a sealing means for said charge, the needle being apertured for communication with said charge upon the breaking of said seal and means for unsealing said charge in response to the impact of the bullet, including an axially movable perforated stem associated with said needle and adapted to penetrate the container.

16. In a hypodermic bullet, a bullet body, a needle projecting forwardly from the forward end of said body, a yielding walled container positioned within the bullet body and adapted to maintain a hypodermic charge under pressure, a sealing means for said charge, the needle being apertured for communication with said charge upon the breaking of said seal and means for unsealing said charge in response to the impact of the bullet, and a barb on said needle.

17. In a hypodermic bullet, a bullet body, a needle projecting forwardly from the forward end of said body, a yielding walled container positioned within the bullet body and adapted to maintain a hypodermic charge under pressure, a sealing means for said charge, the needle being apertured for communication with said charge upon the breaking of said seal and means for unsealing said charge in response to the impact of the bullet, a flight guiding means associated with the end of the bullet opposite to the needle and adapted to maintain the needle in parallelism with the path of movement of the bullet.

18. In a hypodermic bullet, a bullet body, a hollow needle projecting forwardly from the forward end of said body, a container positioned within said bullet body, and adapted to maintain a hypodermic charge therein under pressure, means for sealing said charge within said container, and means for breaking said seal and for permitting the charge to escape through said needle, in response to the impact of the bullet, including an axially movable perforated stem associated with said needle and adapted to penetrate said container.

Signed at Chicago, county of Cook and State of Illinois, this 1st day of Sept., 1927.

BARNETT HARRIS.